(12) United States Patent
Miyamoto et al.

(10) Patent No.: US 9,467,625 B2
(45) Date of Patent: Oct. 11, 2016

(54) IMAGING DEVICE CAPABLE OF COMBINING IMAGES

(75) Inventors: Naotomo Miyamoto, Tokyo (JP); Kosuke Matsumoto, Akishima (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 643 days.

(21) Appl. No.: 13/435,879

(22) Filed: Mar. 30, 2012

(65) Prior Publication Data

US 2012/0249729 A1 Oct. 4, 2012

(30) Foreign Application Priority Data

Mar. 31, 2011 (JP) ................................. 2011-077723

(51) Int. Cl.
*H04N 5/232* (2006.01)
*G06T 3/40* (2006.01)

(52) U.S. Cl.
CPC ......... *H04N 5/23293* (2013.01); *G06T 3/4038* (2013.01); *H04N 5/23238* (2013.01)

(58) Field of Classification Search
CPC ............ G06K 9/34; G06K 2009/2045; G06T 7/0028; G06T 2207/20221
USPC .......................................................... 348/36
See application file for complete search history.

(56) References Cited

U.S. PATENT DOCUMENTS

| 6,393,162 | B1 * | 5/2002 | Higurashi | ............... G06T 5/006 345/629 |
| 2003/0210831 | A1 * | 11/2003 | Shinbata | ....................... 382/274 |
| 2011/0249910 | A1 * | 10/2011 | Henderson | ......... G06K 9/00134 382/278 |

FOREIGN PATENT DOCUMENTS

| JP | 06-303562 A | 10/1994 |
| JP | 11-205648 A | 7/1999 |

OTHER PUBLICATIONS

Japanese Office Action dated Mar. 10, 2014 (and English translation thereof) in counterpart Japanese Application No. 2011-077723.

* cited by examiner

*Primary Examiner* — Mehrdad Dastouri
*Assistant Examiner* — Obafemi Sosanya
(74) *Attorney, Agent, or Firm* — Holtz, Holtz & Volek PC

(57) ABSTRACT

A digital camera includes an imaging section, an overlapping area identifying section, a feature point judging section, a luminance adjusting section, and an image combining section. The overlapping area identifying section identifies overlapping areas of images consecutively captured by the imaging section. The feature point judging section judges whether amount of texture within areas of a predetermined range in the identified overlapping areas is larger or smaller than a predetermined reference value. The luminance adjusting section adjusts the pixel values of the images so that the pixel values of the overlapping areas come within a predetermined range, based on a judgment result of the texture. The image combining section combines the adjusted images such that their overlapping areas coincide with each other.

15 Claims, 11 Drawing Sheets

NORMAL IMAGING MODE

FIG. 3
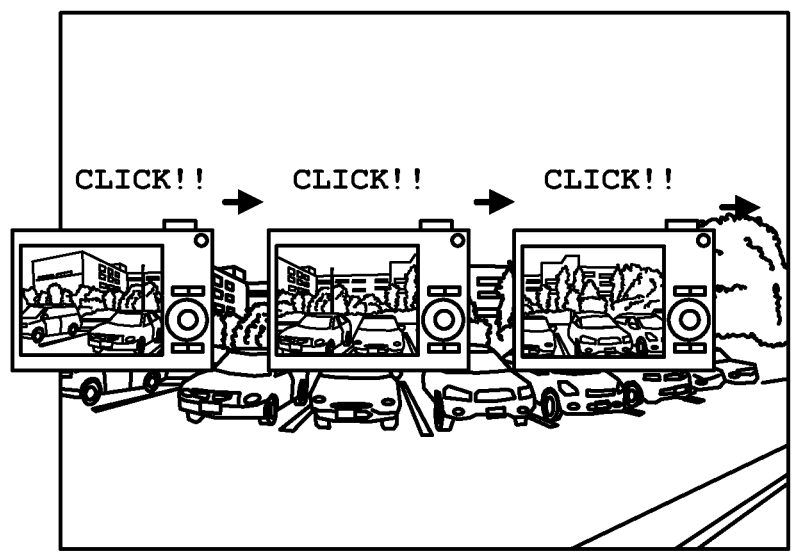
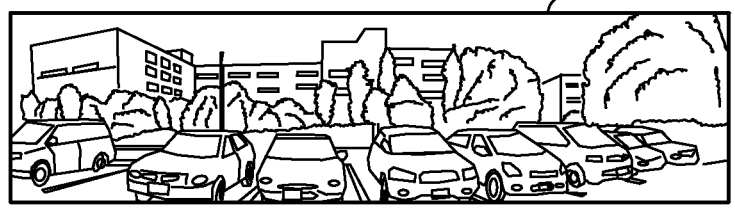

IMAGING DEVICE CAPABLE OF COMBINING IMAGES

CROSS-REFERENCE TO RELATED APPLICATION

This application is based upon and claims the benefit of priority from the prior Japanese Patent Application No. 2011-077723, filed Mar. 31, 2011, the entire contents of which is incorporated herein by reference.

BACKGROUND OF THE INVENTION

1. Field of the Invention

The present invention relates to an imaging device, an image composition device, an image composition method and a recording medium.

2. Description of the Related Art

A conventional technology (for example, refer to Japanese Patent Application Laid-Open (Kokai) Publication No. 06-303562) is known in which, when a user captures images by moving a digital camera substantially held in a vertical direction to rotate in a horizontal direction while pressing the shutter switch, the digital camera generates a panoramic image by combining the captured images such that portions thereof are joined together.

However, in this technology, it is generally difficult to perfectly match the timing at which the shutter is released and the timing of exposure of the image sensor, when images are being captured. Therefore, the exposure values differ with each captured image. Accordingly, there is a problem in that the luminance and the like of a generated panoramic image is off-balance.

SUMMARY OF THE INVENTION

An object of the present invention is to provide an imaging device, an image composition device, an image composition method, and a recording medium which are capable of reducing unnaturalness in a composite image.

In order to achieve the above-described object, in accordance with one aspect of the present invention, there is provided an imaging device comprising an imaging section; an overlapping area identifying section which identifies overlapping areas of images consecutively captured by the imaging section; a texture judging section which judges whether amount of texture within areas of a predetermined range in the overlapping areas identified by the overlapping area identifying section is larger or smaller than a predetermined reference value; an adjusting section which adjusts pixel values of the images so that pixel values of the overlapping areas come within a predetermined range, based on a judgment result by the texture judging section; and a combining section which combines the images whose pixel values have been adjusted by the adjusting section, such that the overlapping areas coincide with each other.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

FIG. 3 is a conceptual diagram for explaining the panoramic imaging mode of the digital camera 1 according to the first embodiment;

DETAILED DESCRIPTION OF THE PREFERRED EMBODIMENTS

The preferred embodiments of the present invention will hereinafter be described with reference to the drawings.

A. First Embodiment

Figure 1:
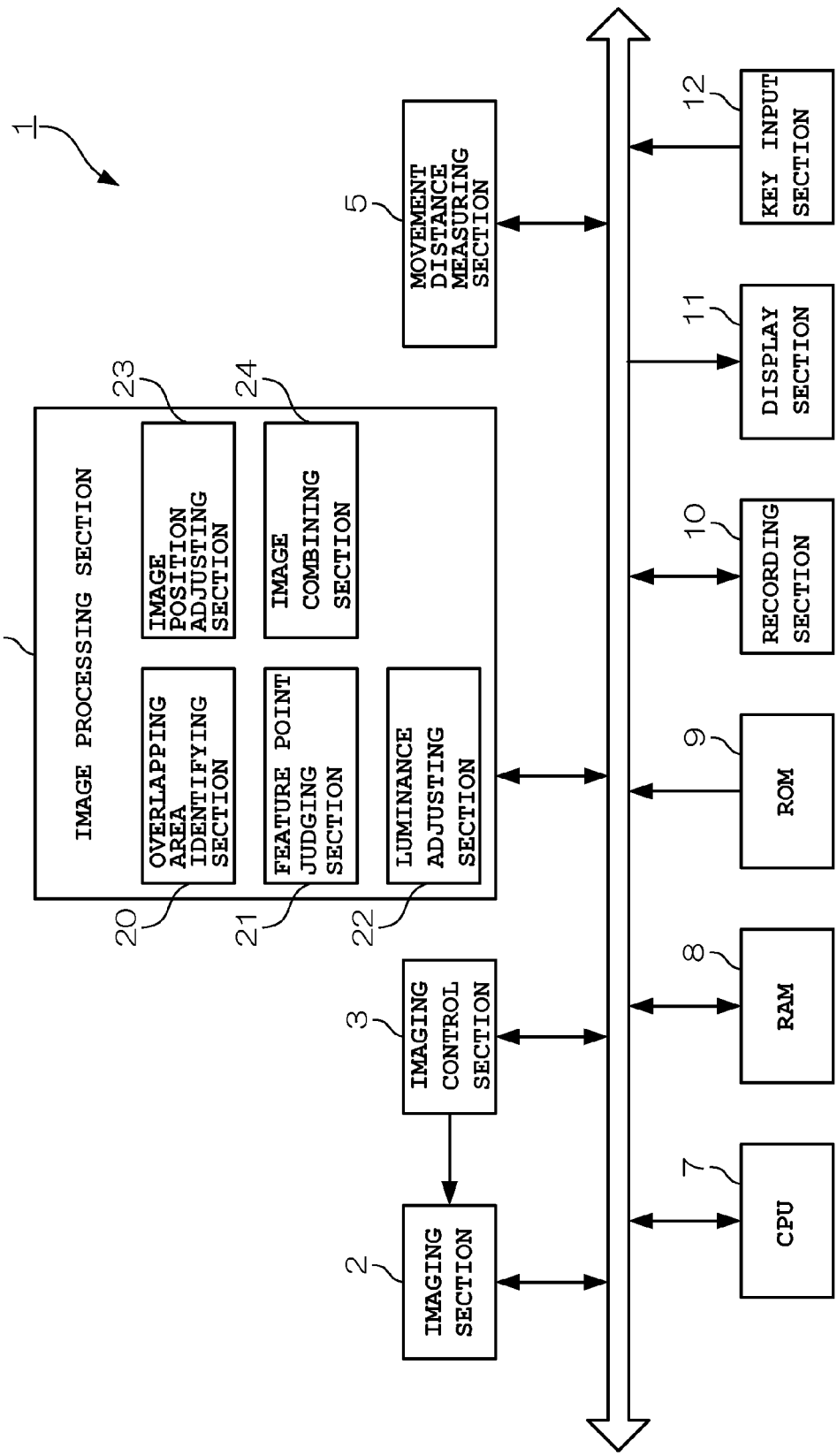
FIG. 1 is a block diagram showing the structure of a digital camera 1 according to a first embodiment of the present invention.

FIG. 1 is a block diagram showing the configuration of a digital camera 1 according to a first embodiment of the present invention. In FIG. 1, the digital camera 1 includes an imaging section 2 (imaging section, image acquiring section), an imaging control section 3, an image processing section 4, a movement distance measuring section 5, a central processing unit (CPU) 7, a random access memory (RAM) 8, a read-only memory (ROM) 9, a recording section 10, a display section 11 and a key input section 12.

The imaging section 2 includes a lens group, such as a focus lens and a zoom lens, and an image sensor (such as a charge-coupled device [CCD]), and adjusts auto-focusing, aperture, zooming, and the like in accordance with control signals from the imaging control section 3. This imaging section 2 converts the light of a photographic subject projected via the lens group into electrical signals by using the image sensor, and outputs them as imaging signals. The imaging control section 3 controls imaging operations performed by the imaging section 2, under the control of the CPU 7.

The image processing section 4 performs image processing of image data captured by the imaging section 2 (pixel interpolation processing, γ-correction, luminance color difference signal generation, white balance processing, exposure correction processing, etc), compression and expansion processing of image data (such as compression and extension in Joint Photographic Experts Group (JPEG) format, Motion-JPEG [M-JPEG] format or Moving Picture Experts Group (MPEG) format), processing for combining a plurality of captured images, etc.

In particular, in the first embodiment, the image processing section 4 includes an overlapping area identifying section 20 (overlapping area identifying section), a feature point judging section 21 (texture judging section, ratio judging section), a luminance adjusting section 22 (adjusting section), an image position adjusting section 23, and an image combining section (combining section). The overlapping area identifying section 20 identifies overlapping areas of images (not all of which are loaded as images for composition) consecutively captured at a predetermined time interval (such as 7 fps or 10 fps) during panoramic imaging. In addition, the overlapping area identifying section 20 identifies overlapping areas of images for composition captured at predetermined positions (loading positions of images for composition) during horizontal movement.

Specifically, in the method for identifying an overlapping area, a plurality of strip-shaped areas (not shown) are set in a shared area of images for composition, the sum of squared differences (SSD) in the luminance of the set strip-shaped areas is calculated, and a position with the smallest SSD is identified as an overlapping area.

The feature point judging section 21 identifies areas without (with a small amount of) texture (areas having changes at the pixel level) using feature points in the above-described overlapping areas. Note that Difference of Gaussians (DOG), Histogram of Oriented Gradients (HOG), the Harris method, corner detection using the main curvature method or other methods may be used to extract these feature points. The luminance adjusting section 22 adjusts the luminance of images for composition so that, when the ratios of areas without texture in their overlapping areas are equal to or larger than a predetermined threshold value, the luminance of the areas without texture are substantially the same (the average value of the luminance of these areas is within a predetermined allowable range). The image position adjusting section 23 adjusts the positions of adjacent images based on the feature points of their overlapping areas. The image combining section 24 combines adjacent images whose positions have been adjusted, and thereby generates a single, joined composite image (panoramic image).

The movement distance measuring section 5 measures the movement distance of the digital camera 1 when the digital camera 1 substantially held in a vertical direction is moved to rotate in a horizontal direction during panoramic imaging. During panoramic imaging, the digital camera 1 consecutively captures images at a predetermined time interval (such as 7 fps or 10 fps), and every time it reaches a predetermined position, an image captured at that point is loaded and stored in the RAM 8 as an image for composition, in order to generate a panoramic image.

Accordingly, it is necessary to detect that the digital camera 1 has reached a predetermined position or has been moved to a predetermined position. In other words, it is necessary to measure the movement distance of the digital camera 1. Therefore, a gyro sensor, an acceleration sensor, or predetermined image processing (such as a method for calculating motion vectors between images) which enables the detection of the movement of the digital camera 1 is used.

In the first embodiment, predetermined image processing is used to detect that the digital camera 1 has reached a predetermine position. Specifically, during panoramic imaging in which the digital camera 1 consecutively captures images at a predetermined time interval (such as 7 fps or 10 fps), the CPU 7 determines whether or not the digital camera 1 has been moved to a predetermined position (composite image acquisition position) by consecutively determining the size of the shared area of the consecutively captured images.

For example, when an image that overlaps with about one-third of the preceding image for composition is captured, the CPU 7 determines that the digital camera 1 has been moved to a predetermined position, and loads the captured image into the RAM 8 as an image for composition. Every time the digital camera 1 is detected to have reached a predetermined position (composite image acquisition position) by the size of the shared area of consecutively captured images being determined as described above, an image captured at that point is loaded into the RAN 8 as an image for composition.

The CPU 7 is a single-chip microcomputer that controls each section of the digital camera 1. In the first embodiment, while the user is moving the digital camera 1 during panoramic imaging, the CPU 7 controls the imaging control section 3, the image processing section 4, the movement distance measuring section 5, and the like to consecutively capture images at a predetermined time interval (such as 7 fps or 10 fps), and to load a captured image into the RAM 8 as an image for composition every time the digital camera 1 reaches a predetermined position (composite image acquisition position). This control is performed until the end of the desired landscape is reached or the panoramic imaging is completed.

The CPU 7 also controls each section to combine the plurality of loaded captured images in a manner that they are partially overlapped with each other (while, for example, changing the transparency), and thereby generate a single composite image (panoramic image) that appears to have been captured at a wide angle. Here, when combining the plurality of loaded captured images, the CPU 7 adjusts the luminance of the images to be combined so that uneven luminance in their overlapping areas is eliminated. Details of this image composition will be described hereafter.

The RAM 8 is used as a buffer memory that temporarily stores image data captured by the imaging section 2 and as a working memory of the CPU 7. The ROM 9 stores a program necessary for the CPU 7 to control each section of the digital camera 1 and data necessary to control each section, and the CPU 7 performs processing based on this program.

The recording section 10 records composite images (panoramic images) generated by a plurality of captured images being combined. The display section 11 includes a color liquid crystal display (LCD) and a driver circuit thereof. In an imaging stand-by state, the display section 11 displays a photographic subject captured by the imaging section 2 as a live-view image. Also, the display section 11 displays a recorded image that has been read out from the recording section 10 and expanded when it is replayed. The key input section 12 includes a plurality of operation keys, such as a shutter switch (SW), a zoom SW, a mode key, a SET key, and a cross-shaped key, and outputs operation signals based on key operations by the user to the CPU 7.

Figure 2:
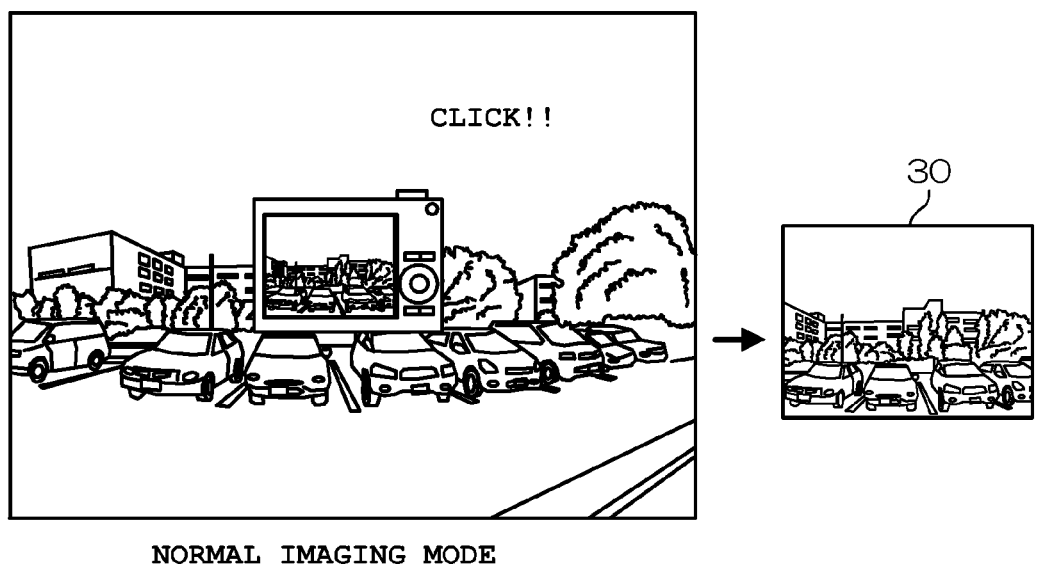
FIG. 2 is a conceptual diagram for explaining a normal imaging mode.

FIG. 2 is a conceptual diagram for explaining a normal imaging mode. As shown in FIG. 2, in the normal imaging mode, the digital camera 1 can only capture an image 30 within the range of the viewing angle of the imaging system in the digital camera 1.

FIG. 3 is a conceptual diagram for explaining the panoramic imaging mode of the digital camera 1 according to the first embodiment. First, the user aims the digital camera 1 at a desired landscape, depresses (half-depression to full depression) the shutter SW at the left-side end of the desired landscape, and moves the digital camera 1 therefrom in the rightward direction, as indicated by the arrows in FIG. 3. Then, the digital camera 1 consecutively captures images at a predetermined time interval (such as 7 fps or 10 fps) and, every time it reaches a predetermined position, loads an image (image for composition) captured at that point into the RAM 8, until the end of the desired landscape is reached or the panoramic imaging is completed. Accordingly, the digital camera 1 sequentially combines the loaded images for composition, and thereby generates a single composite image (panoramic image) 31.

Next, operations of the above-described first embodiment will be described.

Figure 4:
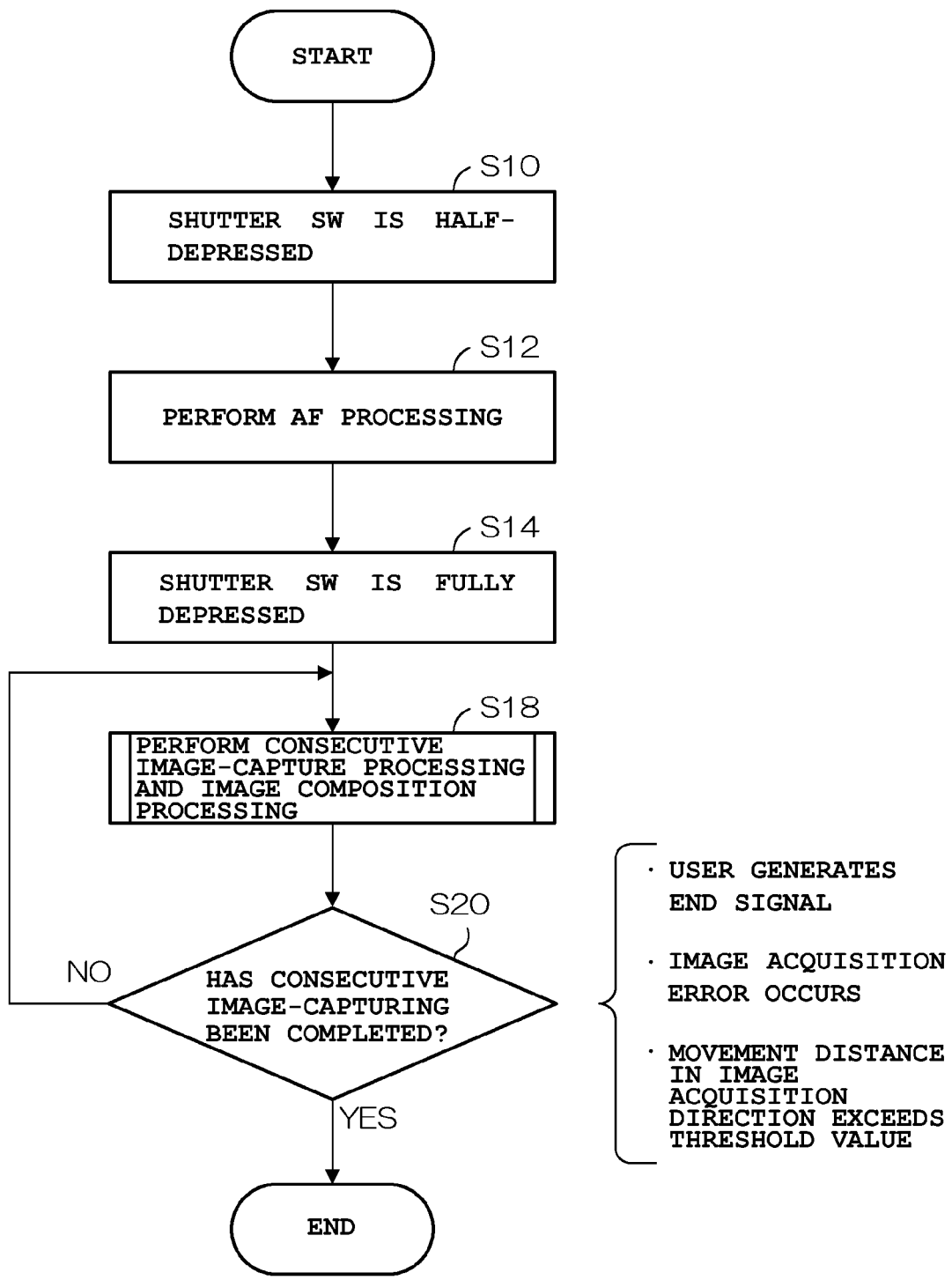
FIG. 4 is a flowchart for explaining operations of the digital camera 1 according to the first embodiment.

FIG. 4 is a flowchart for explaining operations of the digital camera 1 according to the first embodiment. First, the user half-depresses the shutter SW (Step S10), and the CPU 7 controls the imaging control section 3 to perform autofocus (AF) processing in response thereto (Step S12). Then, after fully depressing the shutter SW, the user moves the digital camera 1 to rotate in the horizontal direction (see FIG. 3).

When the user fully depresses the shutter SW (Step S14), the CPU 7 controls the imaging control section 3 to consecutively captures images at a predetermined time interval (such as 7 fps or 10 fps). Then, every time the digital camera 1 reaches a predetermined position, the CPU 7 loads an image captured at that point into the RAM 8, while calculating the camera movement speed. Accordingly, the CPU 7 sequentially combines the loaded images, and thereby generates a single composite image (panoramic image) 31 (Step S18). Details of the consecutive image-capture processing and the image composition processing will be described hereafter.

Next the CPU 7 judges whether or not the consecutive image-capturing has been completed (Step 20). This consecutive image-capturing is completed when, for example, the user generates an end signal (by user operation), when an image acquisition error occurs by the digital camera 1 being moved far off course, or when the movement distance in the image acquisition direction exceeds a threshold value such as when the maximum size of the panoramic image is exceeded. When judged that the consecutive image-capturing has not been completed (NO at Step S20), the CPU 7 returns to Step S18 and continues the consecutive image-capture processing and the image composition processing. Conversely, when judged that the consecutive image-capturing has been completed (YES at Step S20), the CPU 7 ends the processing.

Figure 5:
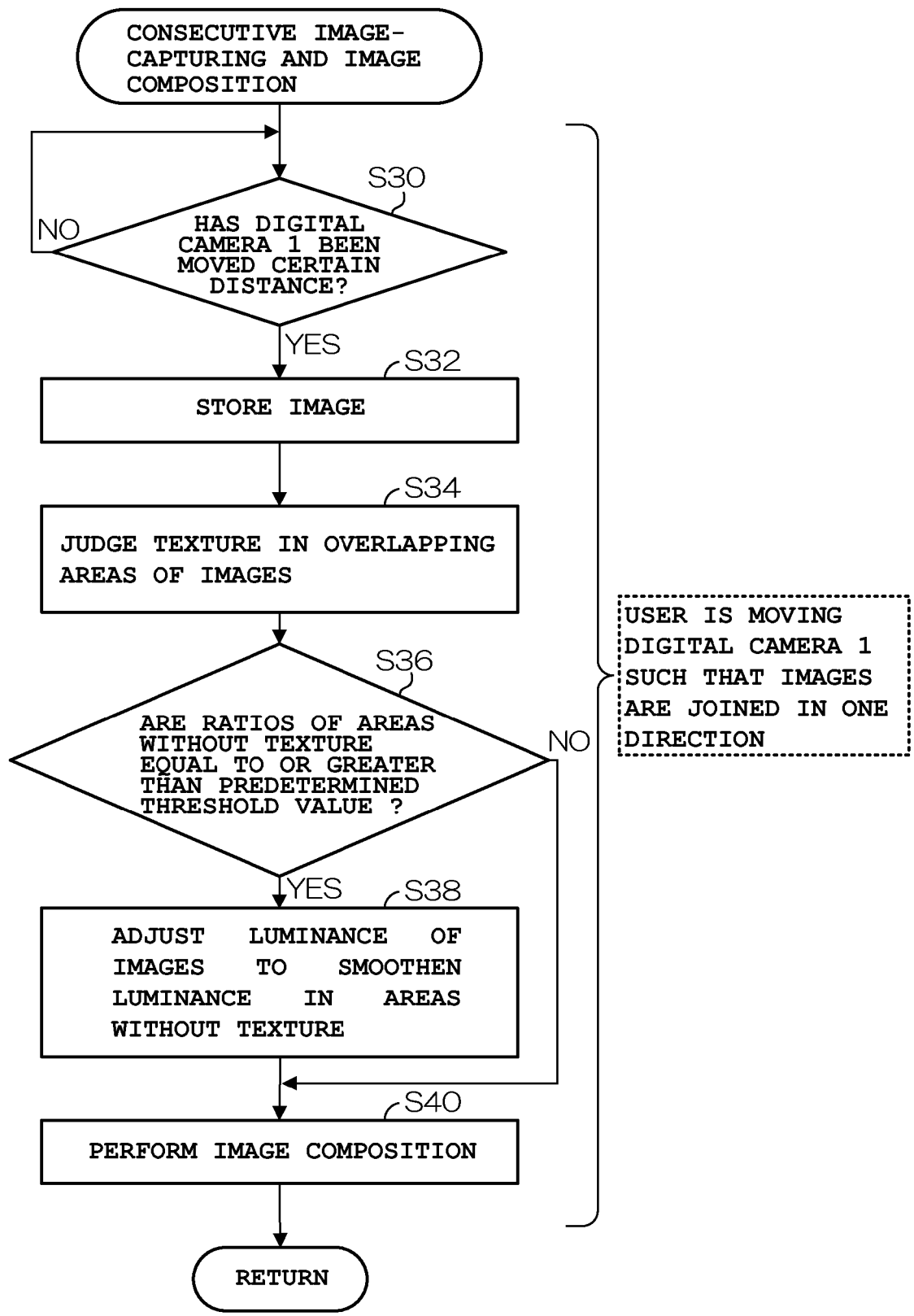
FIG. 5 is a flowchart for explaining operations in consecutive image-capture processing and image composition processing by the digital camera 1 according to the first embodiment.
Figure 6:
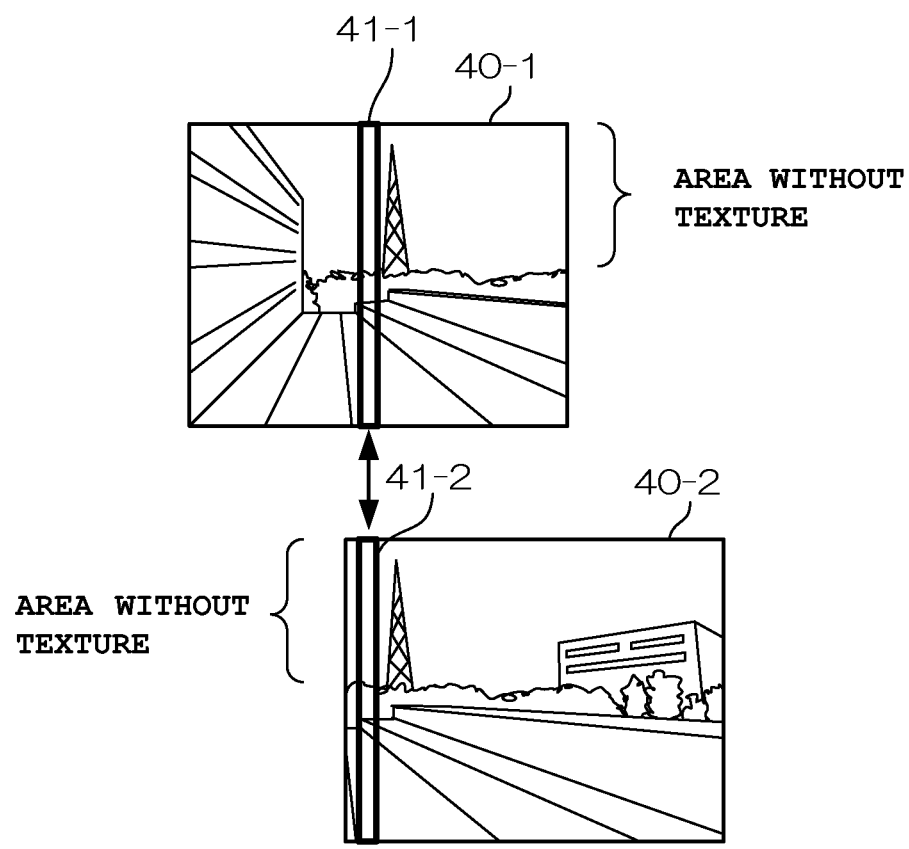
FIG. 6 is a conceptual diagram for explaining the operation of the image composition processing according to the first embodiment.
Figure 7:
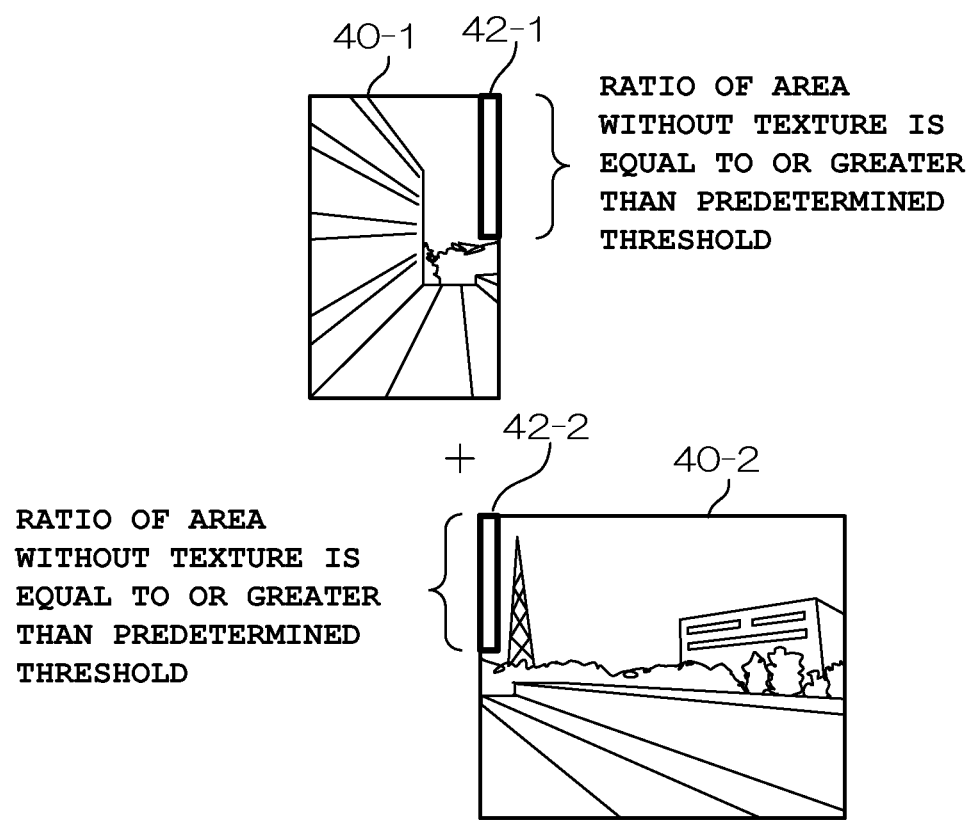
FIG. 7 is also a conceptual diagram for explaining the operation of the image composition processing according to the first embodiment.

FIG. 5 is a flowchart for explaining operations in consecutive image-capture processing and image composition processing by the digital camera 1 according to the first embodiment. FIG. 6 and FIG. 7 are conceptual diagrams for explaining the operation of the image composition processing according to the first embodiment. During the consecutive image-capture processing and the image composition processing, the CPU 7 controls the imaging control section 3 such that the imaging section 2 consecutively captures images of a subject at a predetermined time interval (such as 7 fps or 10 fps). Note that not all of the captured images are loaded into the RAM 8 as images for composition, and that images other than those captured at loading positions are discarded.

First, the CPU 7 judges whether or not the digital camera 1 has been moved a certain distance (Step S30), while judging whether or not a captured image is an image that should be loaded into the RAM 8 as an image for composition, by determining the size of a shared area of the images being consecutively captured at a predetermined time interval. The "image that should be loaded as an image for composition" herein is a captured image that shares an area of a predetermined size (for example, one-third of its area) with the preceding loaded image for composition.

That is, when a captured image is an image that should be loaded as an image for composition, since this indicates that the digital camera 1 has reached a predetermined position, the CPU 7 judges that the digital camera 1 has been moved a certain distance. In other words, the digital camera 1 has not yet reached a predetermined position if the shared area is large, or has passed a predetermined position if the shared area is small.

When judged that the digital camera 1 has not been moved a certain distance (NO at Step S30), the CPU 7 repeatedly performs Step S30 because the digital camera 1 has not yet reached a predetermined position. Conversely, when judged that the digital camera 1 has been moved a certain distance (YES at Step S30), the CPU 7 loads and stores an image captured at this point into the RAM 8 (Step S32).

Next, the feature point judging section 21 judges whether the amount of texture in the overlapping areas of the loaded images is larger or smaller than a predetermined reference value by judging the distribution of feature points therein (Step S34). Specifically, when the number of feature points within areas of a predetermined range in the overlapping areas is equal to or less than a predetermined threshold value, the feature point judging section 21 judges that the amount of texture in these areas is smaller than the predetermined reference value (or that these areas are areas without texture). Conversely, when the number of feature points within these areas is greater than the predetermined threshold value, the feature point judging section 21 judges that the amount of texture in these areas is larger than the predetermined reference value (or that these areas are areas with texture).

The image combining section 24 combines an image for composition 40-1 and an image for composition 40-2 such that an overlapping area 41-1 and an overlapping area 41-2 overlap with each other, as shown in FIG. 6. In each of the upper portions of the overlapping areas 41-1 and 41-2, an area without texture (an area that is flat at the pixel level) is present.

Next, the feature point judging section 21 judges whether or not the ratios of the areas without texture are equal to or greater (i.e., larger) than a predetermined threshold value (such as one-third of the entire area) (Step S36). This is because, when the area without texture is small, the effect of luminance smoothing is minimal. When the ratios of the areas without texture are less than a predetermined threshold value (such as one-third of the entire area), the image combining section 24 combines the preceding image for composition and the currently loaded image for composition without performing any processing (Step S40), and returns to processing in the main routine shown in FIG. 4.

As shown in FIG. 7, when an area without texture 42-1 and an area without texture 42-2 are each substantially half of the entire area, or in other words, when the ratios of these areas without texture are equal to or larger than a predetermined threshold value (such as one-third of the entire area), the luminance adjusting section 22 adjusts the luminance of the images for composition (or the luminance of the latter captured image for composition) by smoothing the luminance of the area without texture 42-1 and the luminance of the area without texture 42-2 to be substantially the same (the same to the extent that the average value of the luminance of both areas come within a predetermined allowable range) (Step S38). Subsequently, the image combining section 24 combines the preceding image for composition and the currently loaded image for composition (Step S40). Then, the CPU 7 returns to processing in the main routine shown in FIG. 4.

Hereafter, until the consecutive capturing by the panoramic imaging is completed, the luminance adjustment of images for composition and the composition of the luminance-adjusted images are performed on each of a plurality of images for composition which are consecutively loaded, whereby a single, joined composite image (panoramic image) is generated.

In the above-described first embodiment, the luminance adjusting section 22 adjusts the luminance of images for composition (or the luminance of a latter captured image for composition) by smoothing the luminance of areas without texture in their overlapping areas to be substantially the same (the same to the extent that the average value of the luminance of both areas come within a predetermined allowable range), before the image combining section 24 combines the images for composition to be partially overlapped with each other. Then, the image combining section 24 combines the images for composition. Therefore, unnaturalness in a composite image created by consecutively captured images being combined is reduced.

B. Second Embodiment

Next, a second embodiment of the present invention will be described.

The second embodiment is characterized in that luminance differences of overlapping areas can be further mitigated when performing image composition by varying the widths (blending widths) of overlapping areas in areas where the amount of texture is larger than a predetermined reference value and in areas where the amount of texture is smaller than the predetermined reference value.

Figure 8:
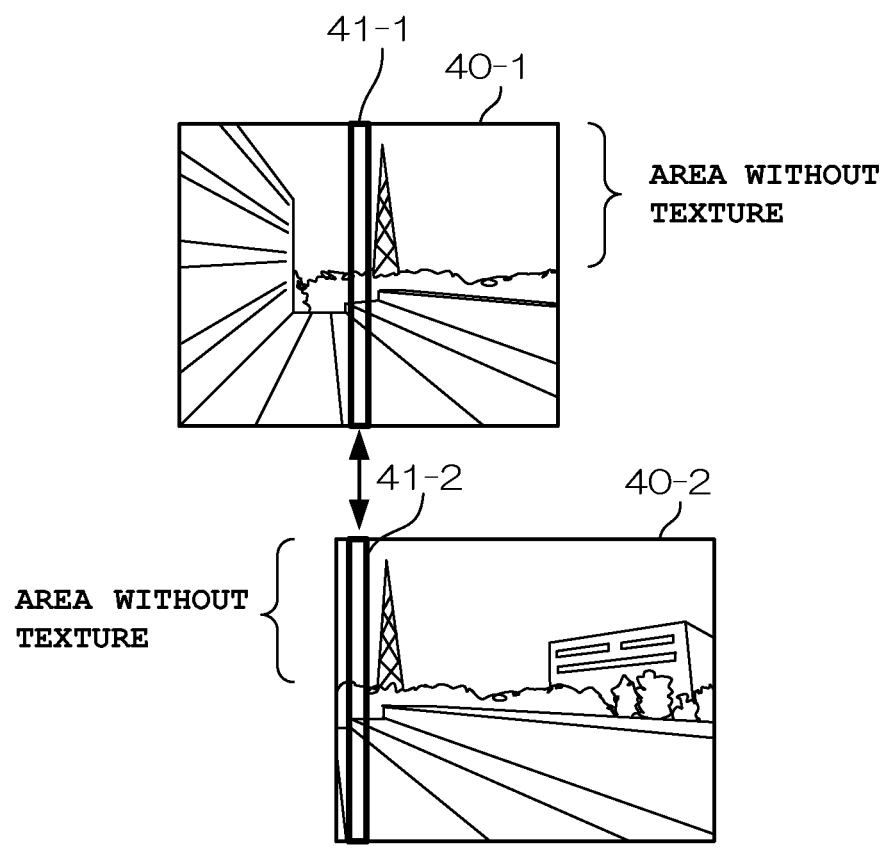
FIG. 8 is a conceptual diagram for explaining operations of a second embodiment.
Figure 9:
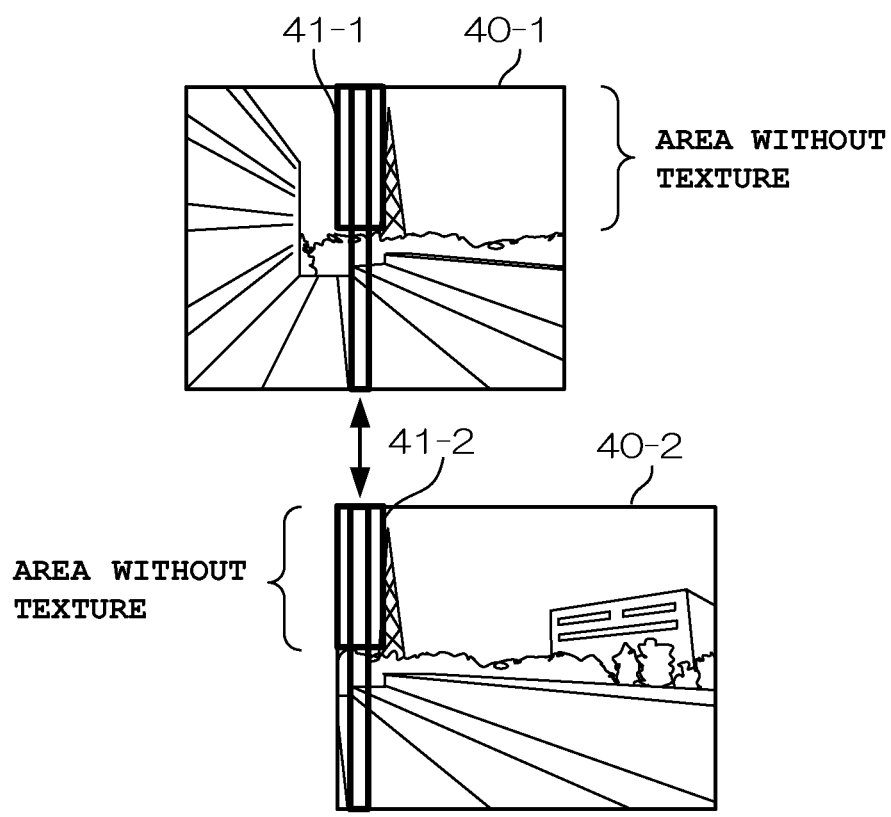
FIG. 9 is also a conceptual diagram for explaining operations of the second embodiment.
Figure 10:
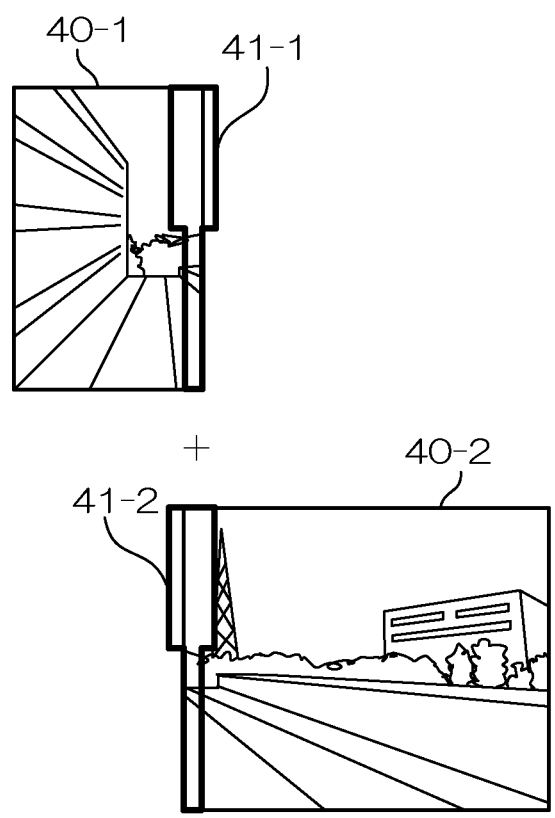
FIG. 10 is also a conceptual diagram for explaining operations of the second embodiment.

FIG. 8 to FIG. 10 are conceptual diagrams for explaining operations of the second embodiment. As shown in FIG. 8, the image combining section 24 combines the image for composition 40-1 and the image for composition 40-2 such that the overlapping area 41-1 and the overlapping area 41-2 overlap with each other as in the case of FIG. 6. In each of the upper portions of the overlapping areas 41-1 and 41-2, an area without texture (sky portion) is present.

Whether the amount of texture is large (area with texture) or small (area without texture) can be judged based on the number of feature points within an area of a predetermined range. That is, when the number of feature points within areas of a predetermined range in overlapping areas is equal to or less than a predetermined threshold value, these areas are judged to have a small amount of texture (areas without texture). When the number of feature points within these areas is greater than the predetermined threshold value, these areas are judged to have a large amount of texture (areas with texture). Then, as shown in FIG. 9, the widths (blending widths) of the overlapping areas 41-1 and 41-2 are increased in areas with a small amount of texture and relatively reduced in areas with a large amount of texture.

Next, the luminance adjusting section 22 adjusts the luminance of the images for composition (or the luminance of the latter captured image for composition) by smoothing the luminance of the overlapping areas 41-1 and 41-2 to be substantially the same (the same to the extent that the average value of the luminance of both areas come within a predetermined allowable range), as shown in FIG. 10. Then, the image combining section 24 combines these images for use in a composition.

According to the aforementioned second embodiment, luminance differences of overlapping areas can be further mitigated when performing image composition by varying the widths (blending widths) of overlapping areas in areas where there is a lot of texture and in areas where there is little texture.

Figure 11:
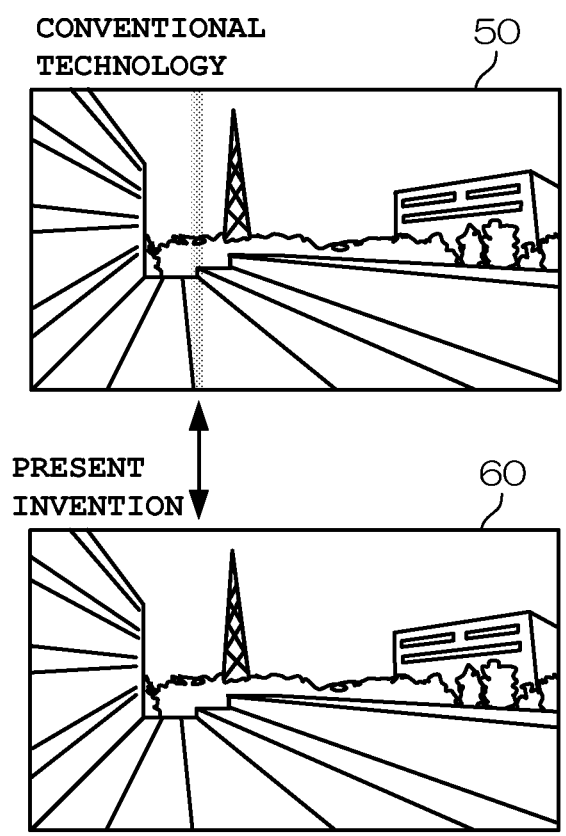
FIG. 11 is a schematic diagram showing an effect of the image composition processing in the present invention.

FIG. 11 is a schematic diagram showing an effect of the image composition processing in the present invention. In a case where image composition is simply performed as in the conventional technology, it is generally difficult to perfectly match the timing at which the shutter is released and the timing at which the image sensor receives light when images are being captured, as shown in FIG. 11. Accordingly, a difference in brightness appears in a portion of the generated panoramic image 50 where the captured images are overlapping.

In contrast with the conventional technology, in the present invention, the luminance adjusting section 22 adjusts the luminance of images for composition (or the luminance of a latter captured image for composition) by smoothing the luminance of areas without texture (areas with a small amount of texture) in their overlapping areas to be substantially the same (the same to the extent that the average value of the luminance of both areas come within a predetermined allowable range), before the image combining section 24 combines the images for composition to be partially overlapped with each other. Then, the image combining section 24 combines the images for composition. Therefore, unnaturalness in a portion of the generated panoramic image 60 where the captured images are overlapping is reduced.

In the above-described first and second embodiments images are combined every time a captured image for composition is loaded during consecutive image-capturing by panoramic imaging. However, a configuration may be adopted in which images are combined after all necessary images for composition are stored. In this configuration, when all images for composition are acquired, the feature point judging section 21 judges the overall luminance variation. Next, the luminance adjusting section 22 adjusts the luminance of the acquired images by smoothing the luminance of areas without texture (areas with a small amount of texture) within their overlapping areas to be substantially the same (the same to the extent that the average value of the luminance of both areas come within a predetermined allowable range) with reference to, for example, an image for composition which has an intermediate level of luminance among all the images for composition. Then, the image combining section 24 combines these images for use in a composition.

While the present invention has been described with reference to the preferred embodiments, it is intended that the invention be not limited by any of the details of the description therein but includes all the embodiments which fall within the scope of the appended claims.

What is claimed is:

1. An imaging device comprising:
   an imaging section;
   an overlapping area identifying section which identifies overlapping areas of each adjacent image consecutively captured by the imaging section;
   a texture judging section which judges whether an amount of texture in the overlapping areas identified by the overlapping area identifying section is smaller than a predetermined reference value;
   a region decision section which decides, with respect to each pair of adjacent images, (i) a first region where the amount of texture is smaller than the predetermined reference value, in the overlapping area of one of the adjacent images of the pair of adjacent images, and (ii) a second region where the amount of texture is smaller than the predetermined reference value, in the overlapping area of the other adjacent image of the pair of adjacent images;

a ratio judging section which judges whether or not a ratio of at least one the first region and the second region to the corresponding overlapping area is equal to or greater than a predetermined threshold value;

an adjusting section which, in a case in which the ratio judging section judges that the ratio is equal to or greater than the predetermined threshold value, widens widths of the overlapping areas in areas corresponding to the first region and the second region to be wider than widths of areas of the overlapping areas where the amount of texture is not smaller than the predetermined reference value, and adjusts, with respect to existing pixel values of the adjacent images, the pixel values in at least one of the overlapping areas so that the pixel values of the overlapping areas come within a predetermined range; and a combining section which combines the adjacent images such that the overlapping areas of the adjacent images coincide with each other.

2. The imaging device according to claim 1, wherein the adjusting section adjusts the pixel values of at least one of the first region and the second region so that the pixel values of the first region and the second region come within the predetermined range, in the case in which the ratio judging section judges that the ratio is equal to or greater than the predetermined threshold value.

3. The imaging device according to claim 1, wherein the ratio judging section detects feature points in the overlapping areas, and judges, based on a distribution state of the feature points in the overlapping areas, whether or not the ratio is equal to or greater than the predetermined threshold value.

4. The imaging device according to claim 1, wherein the pixel values are luminance values.

5. An image composition device comprising:

an overlapping area identifying section which identifies overlapping areas of each of adjacent ones of consecutively captured images;

a texture judging section which judges whether an amount of texture in the overlapping areas identified by the overlapping area identifying section is smaller than a predetermined reference value;

a region decision section which decides, with respect to each pair of adjacent images, (i) a first region where the amount of texture is smaller than the predetermined reference value, in the overlapping area of one of the adjacent images of the pair of adjacent images, and (ii) a second region where the amount of texture is smaller than the predetermined reference value, in the overlapping area of the other adjacent image of the pair of adjacent images;

a ratio judging section which judges whether or not a ratio of at least one the first region and the second region to the corresponding overlapping area is equal to or greater than a predetermined threshold value;

an adjusting section which, in a case in which the ratio judging section judges that the ratio is equal to or greater than the predetermined threshold value, widens widths of the overlapping areas in areas corresponding to the first region and the second region to be wider than widths of areas of the overlapping areas where the amount of texture is not smaller than the predetermined reference value, and adjusts, with respect to existing pixel values of the adjacent images, the pixel values in at least one of the overlapping areas so that the pixel values of the overlapping areas come within a predetermined range; and a combining section which combines the adjacent images such that the overlapping areas of the adjacent images coincide with each other.

6. An image composition method comprising:

acquiring consecutively captured images;

identifying overlapping areas of each of adjacent ones of the acquired images;

judging whether an amount of texture in the identified overlapping areas is smaller than a predetermined reference value;

deciding, with respect to each pair of adjacent images, (i) a first region where the amount of texture is smaller than the predetermined reference value, in the overlapping area of one of the adjacent images of the pair of adjacent images, and (ii) a second region where the amount of texture is smaller than the predetermined reference value, in the overlapping area of the other adjacent image of the pair of adjacent images;

judging whether or not a ratio of at least one the first region and the second region to the corresponding overlapping area is equal to or greater than a predetermined threshold value;

in a case in which it is judged that the ratio is equal to or greater than the predetermined threshold value, widening widths of the overlapping areas in areas corresponding to the first region and the second region to be wider than widths of areas of the overlapping areas where the amount of texture is not smaller than the predetermined reference value, and adjusting existing pixel values of the adjacent images in at least one of the overlapping areas thereof so that the pixel values of the overlapping areas come within a predetermined range; and combining the adjacent images such that the overlapping areas of the adjacent images coincide with each other.

7. A non-transitory computer-readable storage medium having stored thereon a program that is executable by a computer, the program being executable by the computer to perform functions comprising:

image acquisition processing for acquiring consecutively captured images;

overlapping area identification processing for identifying overlapping areas of each of adjacent ones of the images acquired in the image acquisition processing;

texture judgment processing for judging whether an amount of texture in the overlapping areas identified in the overlapping area identification processing is smaller than a predetermined reference value;

region decision processing for deciding, with respect to each pair of adjacent images, (i) a first region where the amount of texture is smaller than the predetermined reference value, in the overlapping area of one of the adjacent images of the pair of adjacent images, and (ii) a second region where the amount of texture is smaller than the predetermined reference value, in the overlapping area of the other adjacent image of the pair of adjacent images;

ratio judgment processing for judging whether or not a ratio of at least one the first region and the second region to the corresponding overlapping area is equal to or greater than a predetermined threshold value;

adjustment processing for, in a case in which it is judged that the ratio is equal to or greater than the predetermined threshold value, widening widths of the overlapping areas in areas corresponding to the first region and the second region to be wider than widths of areas of the overlapping areas where the amount of texture is not smaller than the predetermined reference value, and adjusting existing pixel values of the adjacent images in at least one of the overlapping areas thereof so that the pixel values of the overlapping areas come within a predetermined range; and composition processing for combining the adjacent images such that the overlapping areas of the adjacent images coincide with each other.

8. The imaging device according to claim 1, further comprising:

a calculation section which calculates the amount of texture in the overlapping areas identified by the overlapping area identifying section, wherein the texture judging section judges whether the amount of texture calculated by the calculation section is smaller than the predetermined reference value.

9. The imaging device according to claim 1, wherein the imaging section consecutively captures the images while being moved in a predetermined direction.

10. The imaging device according to claim 1, wherein the adjusting section maintains the existing pixel values in the at least one of the overlapping areas without performing any processing thereon in the case in which the texture judging section judges that the amount of texture in the overlapping areas is greater than the predetermined reference value.

11. The imaging device according to claim 1, wherein the pixel values are luminance values, and the adjusting the pixel values by the adjusting section comprises smoothing the luminance values of the pixels.

12. The imaging device according to claim 1, wherein the combining section combines the adjacent images after the pixel values thereof have been adjusted by the adjusting section.

13. The imaging device according to claim 11, wherein the combining section combines the adjacent images after the luminance values of the overlapping areas thereof have been smoothed by the adjusting section.

14. The imaging device according to claim 1, wherein the adjusting section adjusts, with respect to the existing pixel values of the adjacent images, the pixel values in at least one of the overlapping areas, in the case in which the ratio judging section judges that the ratio of each of the first region and the second region to the corresponding overlapping area is equal to or larger than the predetermined threshold value.

15. The imaging device according to claim 1, wherein the adjusting section adjusts, with respect to the existing pixel values of the adjacent images, the pixel values in at least one of the overlapping areas so that the pixel values of the first region and the pixel values of the second region are substantially the same, in the case in which the ratio judging section judges that the ratio is equal to or greater than the predetermined threshold value.

* * * * *

UNITED STATES PATENT AND TRADEMARK OFFICE
CERTIFICATE OF CORRECTION

PATENT NO.        : 9,467,625 B2
APPLICATION NO.   : 13/435879
DATED             : October 11, 2016
INVENTOR(S)       : Naotomo Miyamoto et al.

It is certified that error appears in the above-identified patent and that said Letters Patent is hereby corrected as shown below:

In the Claims

Column 9, Line 8, after "one" insert --of--.

Column 9, Line 59, after "one" insert --of--.

Column 10, Line 65, after "one" insert --of--.

Signed and Sealed this
Twenty-fourth Day of January, 2017

Michelle K. Lee
*Director of the United States Patent and Trademark Office*